United States Patent

Hung

(10) Patent No.: US 9,532,023 B2
(45) Date of Patent: Dec. 27, 2016

(54) COLOR REPRODUCTION OF DISPLAY CAMERA SYSTEM

(71) Applicant: Konica Minolta Laboratory U.S.A., Inc., San Mateo, CA (US)

(72) Inventor: Po-Chieh Hung, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 14/229,227

(22) Filed: Mar. 28, 2014

(65) Prior Publication Data

US 2014/0292997 A1 Oct. 2, 2014

Related U.S. Application Data

(60) Provisional application No. 61/806,660, filed on Mar. 29, 2013.

(51) Int. Cl.
*H04N 7/14* (2006.01)
*H04N 9/73* (2006.01)

(52) U.S. Cl.
CPC .............. *H04N 9/735* (2013.01); *H04N 7/141* (2013.01)

(58) Field of Classification Search
USPC ...................................... 348/14.01–14.09, 180
See application file for complete search history.

(56) References Cited

U.S. PATENT DOCUMENTS

| 7,728,845 | B2* | 6/2010 | Holub | G01J 3/02 345/589 |
|---|---|---|---|---|
| 8,638,340 | B2* | 1/2014 | Holub | G01J 3/02 345/589 |
| 2006/0280360 | A1* | 12/2006 | Holub | G01J 3/02 382/162 |
| 2007/0091320 | A1* | 4/2007 | Hu | G01B 11/2513 356/604 |
| 2007/0171380 | A1* | 7/2007 | Wright | G03B 21/14 353/69 |
| 2009/0184904 | A1 | 7/2009 | S. et al. | |
| 2009/0219287 | A1* | 9/2009 | Wang et al. | 345/426 |
| 2010/0289835 | A1* | 11/2010 | Holub | G01J 3/02 345/690 |
| 2011/0019108 | A1* | 1/2011 | Nelson et al. | 348/745 |
| 2012/0127324 | A1* | 5/2012 | Dickins et al. | 348/191 |
| 2014/0132778 | A1* | 5/2014 | Holub | G01J 3/02 348/191 |
| 2014/0209682 | A1* | 7/2014 | Gottwals | G06K 7/10544 235/454 |
| 2014/0232625 | A1* | 8/2014 | Murase et al. | 345/89 |

(Continued)

OTHER PUBLICATIONS

Brightline, LP, "Basic Principles of Video Conferencing Lighting," Oct. 2002 (5 pages).

(Continued)

*Primary Examiner* — Maria El-Zoobi
(74) *Attorney, Agent, or Firm* — Osha Liang LLP

(57) ABSTRACT

A method including: outputting, for display on a display device, a plurality of test patterns; obtaining, from a camera, a plurality of test images of a subject exposed to the plurality of test patterns displayed on the display device; generating a first color transformation based on the plurality of test images; and adjusting a color balance of the camera based on the first color transformation.

20 Claims, 5 Drawing Sheets

(56) References Cited

U.S. PATENT DOCUMENTS

2014/0232923 A1\* 8/2014 Koh .................. G09G 5/02
                                                348/333.11
2016/0057399 A1\* 2/2016 Holub ................ G01J 3/02
                                                348/223.1

OTHER PUBLICATIONS

John Haney Software, "Flashlight," printed on Mar. 26, 2013 (3 pages).

\* cited by examiner

COLOR REPRODUCTION OF DISPLAY CAMERA SYSTEM

CROSS-REFERENCE TO RELATED APPLICATIONS

This application is a non-provisional patent application of U.S. Provisional Patent Application Ser. No. 61/806,660, filed on Mar. 29, 2013, and entitled: "Color Reproduction of Display Camera System." Accordingly, this non-provisional patent application claims priority to U.S. Provisional Patent Application Ser. No. 61/806,660 under 35 U.S.C. §119(e). U.S. Provisional Patent Application Ser. No. 61/806,660 is hereby incorporated in its entirety.

BACKGROUND

Displays and cameras are used together in video conferencing, for example personal video conferencing or video telephones. Ideally, the images displayed during video conferencing should represent the scene under ambient lighting conditions. However, the displays commonly used in video conference emit a non-negligible amount of light. Accordingly, when video conferencing, the image display of a first participant contributes to the image seen by the other participants that are participating in the video conferencing. The light emitted from an image display of the first party may not be well suited for color reproduction and results in poor image quality for the other participants. As a result, the color of an object, such as a face and/or glasses, displayed to the other participants may take on a hue of color being emitted by the display of the first participant.

Recently, smart phones have been used for personal video conferences. However, the illumination conditions when using a smart phone for video conferencing may vary widely. For example, smart phones may be used to video conference in bright conditions, such as a sunny day, or under dim conditions, such as on an airplane, bus and/or train.

Typically, video conferencing devices ignore the light emitted from the displayed and do not modify the behavior of the camera corresponding to the light emitted by the display. The camera is completely independent from the light shone on the object from the display image. As a result, particularly in a personal video conference system, the scene may be significantly colored by the display light and result in images picked up by the camera that have a corresponding hue of color.

SUMMARY

In general, in one aspect, the invention relates to a method. The method comprises: outputting, for display on a display device, a plurality of test patterns; obtaining, from a camera, a plurality of test images of a subject exposed to the plurality of test patterns displayed on the display device; generating a first color transformation based on the plurality of test images; and adjusting a color balance of the camera based on the first color transformation.

In general, in one aspect, the invention relates to a method. The method comprises: generating a color transformation based on emission of light from a display device; and adjusting a color balance of a camera based on the color transformation.

In general, in one aspect, the invention relates to a non-transitory computer readable medium (CRM) storing instructions. The instructions comprise functionality for: outputting, for display on a display device, a plurality of test patterns; obtaining, from a camera, a plurality of test images of a subject exposed to the plurality of test patterns displayed on the display device; generating a first color transformation based on the plurality of test images; and adjusting a color balance of the camera based on the first color transformation.

In general, in one aspect, the invention relates to an apparatus. The apparatus comprises: a display device that displays a plurality of test patterns; a camera configured to obtain a plurality of test images of a subject exposed to the plurality of test patterns displayed by the display device; and a controller configured to: generate a first color transformation based on the plurality of test images; and adjust a color balance of the camera based on the first color transformation.

In general, in one aspect, the invention relates to an apparatus. The apparatus comprises: a display device; a camera; and a controller configured to: generate a color transformation based on emission of light from the display device; and adjust a color balance of the camera based on the color transformation.

Other aspects and advantages of the disclosure will be apparent from the following description and the appended claims.

DETAILED DESCRIPTION

Figure 1:
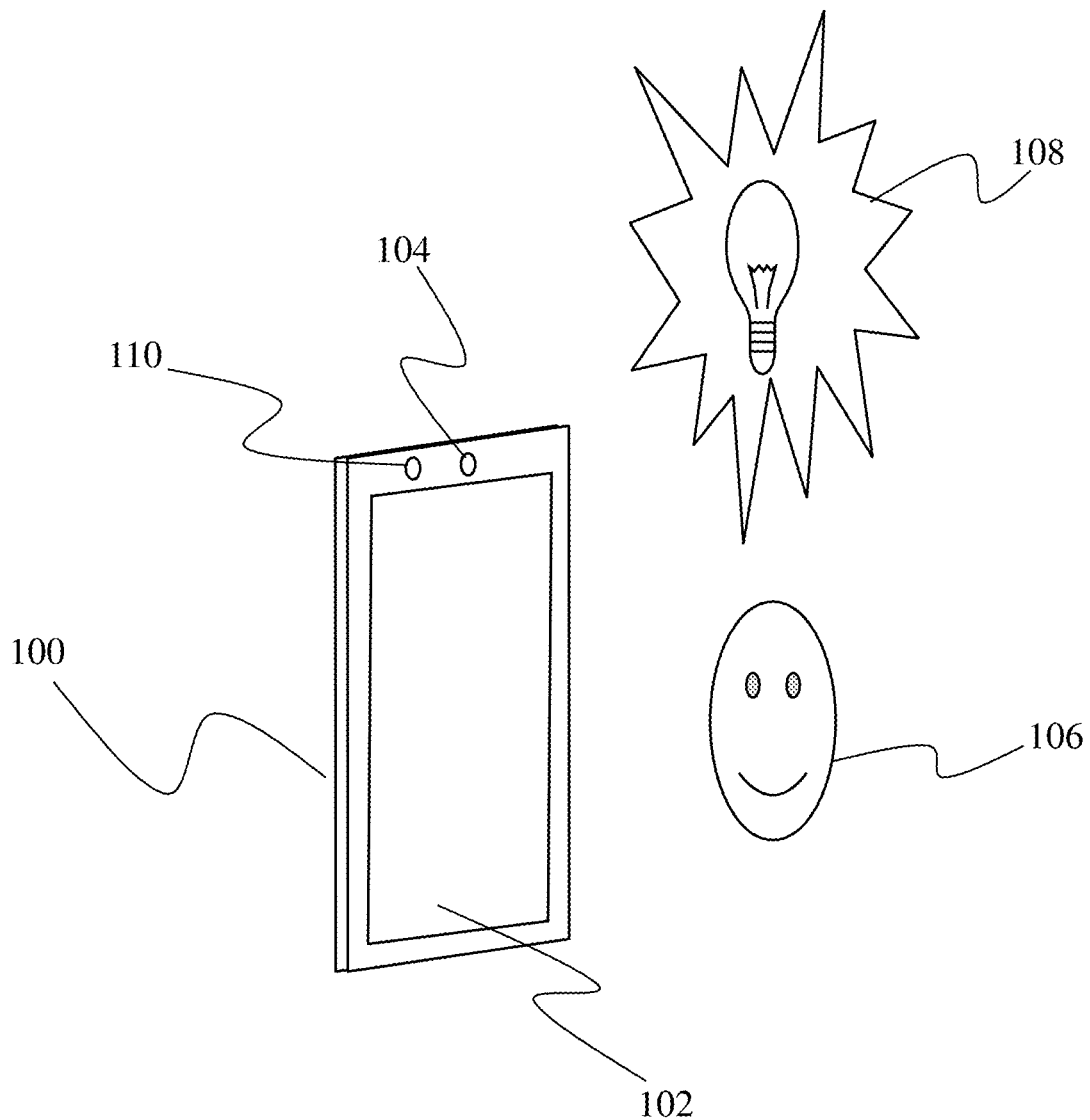
FIG. 1 shows a schematic in accordance with one or more embodiments of the invention.

Specific embodiments of the invention will now be described in detail with reference to the accompanying figures. Like elements in the various figures are denoted by like reference numerals for consistency. Further, the use of "Fig." in the drawings is equivalent to the use of the term "Figure" in the description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and apparatus for accurately adjusting the color balance of a camera based on readings obtained from the camera and/or sensor. One or more embodiments of the invention quantize the effect of the illumination from the display device on the image obtained by the camera and adjusts the color balance of the camera accordingly. The camera balance may be a local balance because the subject's face tends to receive more lights from the display than the background. In one or more embodiments, the camera balance may be adjusted to cancel a reflection in the subject, for example as the result of a subject's eyeglasses.

In one or more embodiments, the display device displays a series of test patterns. The test patterns may include, but are not limited to, a black solid image, a red solid image, a green solid image, and a blue solid image screen. The camera, or sensor, is configured to capture images of a subject(s) in a video teleconference while the test patterns are displayed. An image captured by the camera while the display device is displaying a test pattern may be referred to as a test image. A controller generates one or more color transformations based on the plurality of test images. The color transformations are applied to subsequent images taken by the camera to generate modified, or compensated, images for display to one or more parties of the video conference (or any other party). The display device displays the compensated image, resulting in a video conference with better color reproduction. An image captured by the camera that has not been modified according to the color transformation(s) may be referred to as an uncorrected image. An image captured by the camera that has been modified according to the color transformation(s) may be referred to as a corrected image.

FIG. 1 is a schematic in accordance with one or more embodiments of the invention. In FIG. 1, a video conference device (100) includes an image display (102) and a camera (104). In accordance with one or more embodiments, the image display (102) and a camera (104) are on the same side of the video conference device (100). When video conferencing, the light from the image display (102) shines on the subject (106). In addition, the ambient light (108) in the environment including the subject (106) also contributes to the image captured by the camera (104).

In accordance with one or more embodiments, the video conference device (100) may also include an ambient color sensor (110). The ambient color sensor (110) may be used to detect the amount of ambient light (108) (or a change in ambient light) to adjust the balance between the ambient light (108) and the light emitted from the image display (102). Preferably the camera frame rate and the display frame rate should be synchronized so that the light generated by each frame can be exactly captured by a single exposure of the camera.

Figure 2:
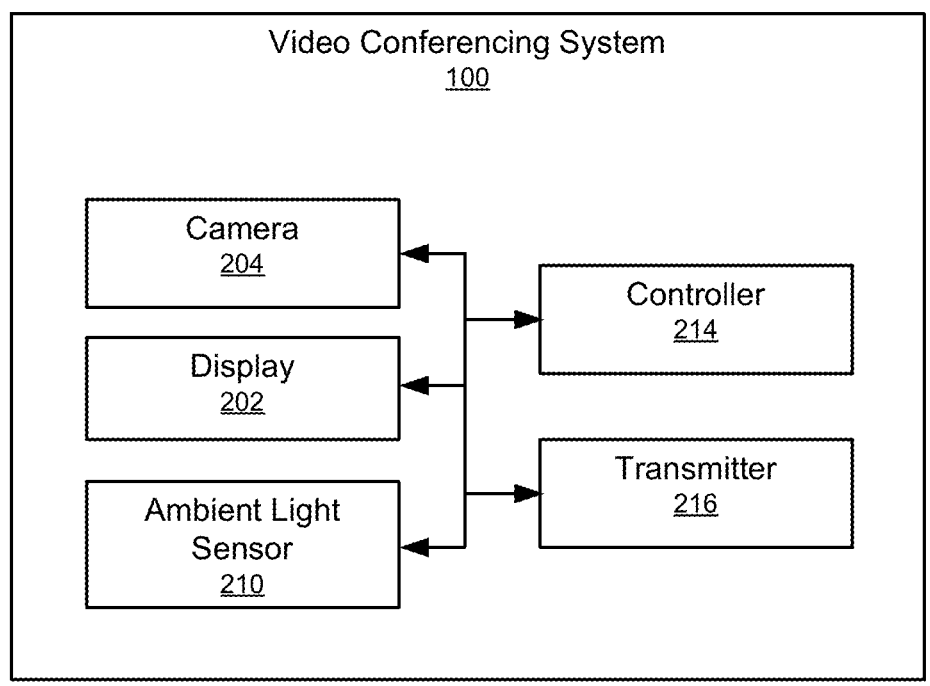
FIG. 2 shows a schematic in accordance with one or more embodiments of the invention.

FIG. 2 shows a schematic in accordance with one or more embodiments of the invention. As shown in FIG. 2, the video conference device (100) includes the camera (204) and image display (202). The video conference device (100) may also include the ambient light sensor (210). The video conference device (100) includes a controller (214) and image data storage (212). The controller (214) calculates the light emitted from the display (202) to the subject in accordance with one or more embodiments of the invention.

In accordance with one or more embodiments, the controller (214) may estimate the effect of the light emitted from the display (202) using predefined test patterns. In one or more embodiments, the display (202) may display the predefined test pattern while the camera (204) captures the subject illuminated by (exposed to) the test pattern. The test patterns may include a blank (i.e., black image) screen, where the captured image is completely illuminated by the ambient light (if any). The test patterns may also include solid colors, such as the primary colors red, blue and green. In these embodiments, the camera (204) may obtain the image of "no image on the display," "red pattern", "green pattern", and "blue pattern." In other words, the camera (204) captures multiple images of the subject, and each image is captured while the subject is viewing one of the test patterns on the display (202). The difference between with-pattern (e.g., red screen, green screen, blue screen) and without-pattern (e.g., black screen) will be the impact of the illumination from display.

In one or more embodiments of the invention, the controller (214) is configured to calculate the tristimulus values (X, Y, Z) for each pixel of each test image. The tristimulus values may then be used to adjust the color balance of the camera (204). For example, the tristimulus values for the solid black image (i.e., blank) screen may be subtracted from the tristimulus values for each of the primary color test patterns. As a result, in accordance with one or more embodiments of the invention, the tristimulus values of the effect of the illumination from the display (202) are determined. Then, the tristimulus values of the effect of the illumination from the display (202) may be used to adjust the tristimulus values of uncorrected images obtained by the camera (204) during the video conference. As a result, the tristimulus values obtained by the camera (204) during the video conference are adjusted to reduce (or even remove) the effect of the illumination from the display (202). The transmitter (216) may transmit the resulting corrected image to one or more participants in the video conference.

In one or more embodiments, the timing of the display and capture of the illumination from the test patterns may be prescheduled. The timing of the test patterns may also be initiated by the subject or participant at the other end of the video conference. In one or more embodiments, a change in the ambient light may trigger the test pattern calibration. The test pattern calibration may also be performed during the initialization of the video conference. In one or more embodiments, the synchronization and timing of the display of the test pattern and the capture of the image may be such that the subject is unaware of the process.

In one or more embodiments, after the test pattern calibration has been performed, a single test pattern, for example the black screen, may be displayed and the capture of the image may be used to determined if further calibration is needed. In these embodiments, the synchronization and timing of the display of the test pattern and the capture of the image may also be such that the subject is unaware.

Figure 3:
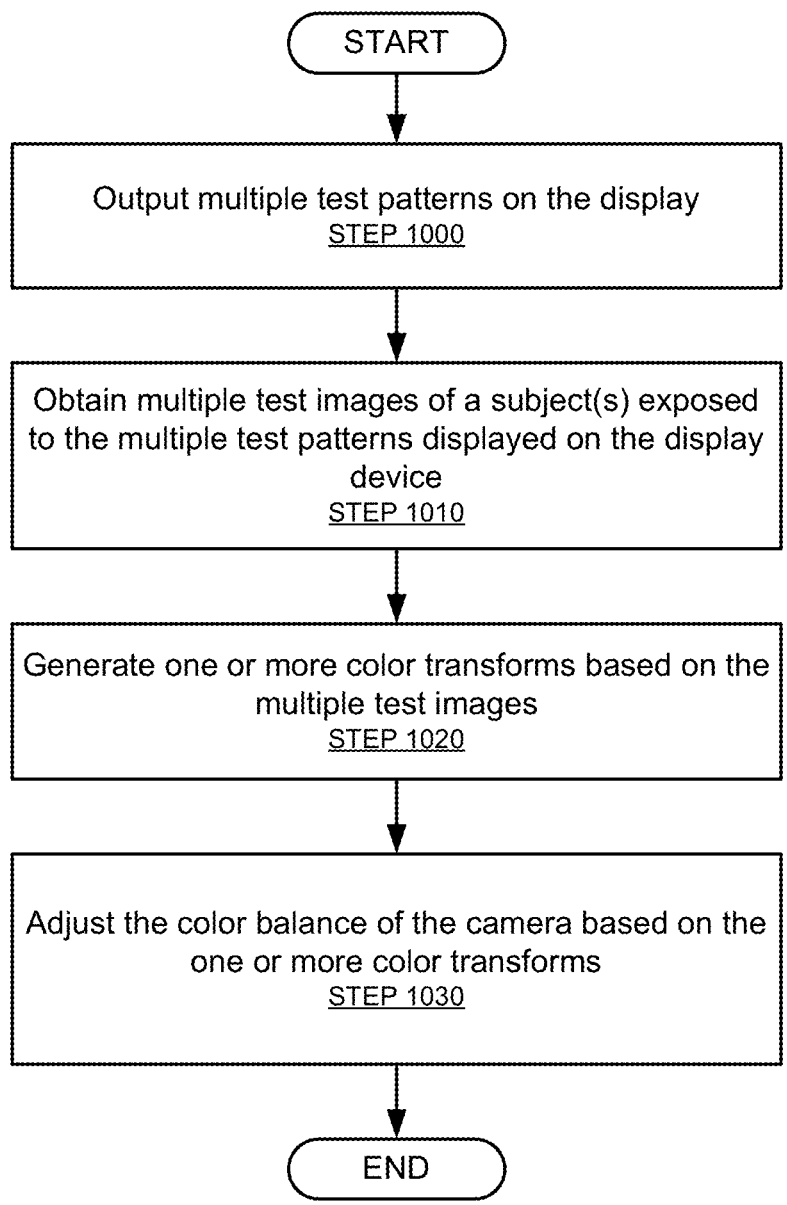
FIG. 3 shows a flow chart in accordance with one or more embodiments of the invention.

FIG. 3 is a flow chart in accordance with one or more embodiments of the invention. One or more of the steps in FIG. 3 may be performed by the components of the system (100) (e.g., camera (204), display (202), controller (214), ambient light sensor (210), transmitter (216), etc.), discussed above in reference to FIG. 2. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

In STEP 1000, one or more test patterns are displayed on a display device. In STEP 1010, a camera obtains a plurality of captured images, referred to as test images, of the subject(s) while exposed to (i.e., viewing) each of the test patterns. The display of the test patterns in STEP 1000 is synchronized with the image capturing of the camera in STEP 1010. In this regard, STEP 1000 and STEP 1010 are simultaneously carried out, as being appreciated by the person of ordinary skill in the art having the benefit of this detailed description.

In STEP 1020, a first color transformation is determined based on the test images captured by the camera. As discussed above, there may be four test images (i.e., one for each of the four test patterns). Initially, the tristimulus values (TV) (X, Y, Z) of each pixel of each of the four test images are calculated. These tristimulus values may be referred to as test tristimulus values (TTV). Then, the TTV corresponding to the effect of light from the image display are calculated according to:

$$X'_r = X_r - X_k$$

$$Y'_r = Y_r - Y_k$$

$$Z'_r = Z_r - Z_k$$

$$X'_g = X_g - X_k$$

$$Y'_g = Y_g - Y_k$$

$$Z'_g = Z_g - Z_k$$

$$X'_b = X_b - X_k$$

$$Y'_b = Y_b - Y_k$$

$$Z'_b = Z_b - Z_k$$

Where $X_k$, $Y_k$, and $Z_k$ are the TTV of a test image taken while the display device displays the solid black image; $X_r$, $Y_r$, and $Z_r$ are the TTV of a test image taken while the display device displays a solid red image; $X_g$, $Y_g$, and $Z_g$ are TTV of a test image taken while the display device displays a solid green image; and $X_b$, $Y_b$, and $Z_b$ are the TTV of a test image taken while the display device displays a solid blue image.

A matrix, corresponding to the color transform, may then be generated with entries corresponding to the differences in TTV:

$$\begin{bmatrix} X'_r & X'_g & X'_b \\ Y'_r & Y'_g & Y'_b \\ Z'_r & Z'_g & Z'_b \end{bmatrix}$$

In STEP 1030, the color balance of the camera is adjusted using the color transformation. Specifically, the camera captures an uncorrected image. The sRGB prime parameters ($R'_{sRGB}$, $G'_{sRGB}$, $B'_{sRGB}$) for each pixel of the uncorrected image are obtained. The sRGB prime parameters are the 8 bit representations of the primary colors used in pixels that have been normalized to a value between 0 and 1. The TV (X, Y, Z) of each pixel of the uncorrected image (i.e., uncorrected TV) is obtained/calculated. The matrix is multiplied with the prime parameters and the resulting matrix product is subtracted from the TV of the uncorrected image:

$$\begin{bmatrix} X'' \\ Y'' \\ Z'' \end{bmatrix} = \begin{bmatrix} X \\ Y \\ Z \end{bmatrix} - \begin{bmatrix} X'_r & X'_g & X'_b \\ Y'_r & Y'_g & Y'_b \\ Z'_r & Z'_g & Z'_b \end{bmatrix} \cdot \begin{bmatrix} R'_{sRGB} \\ G'_{sRGB} \\ B'_{sRGB} \end{bmatrix}$$

Where X'', Y'', and Z'' define the corrected color of the pixel in the corrected image; and X, Y, and Z define the color of the pixel in the uncorrected image taken by the camera.

In one or more embodiments of the invention, the algorithm for calculating the color transformation is the same for every pixel. Additionally or alternatively, in other embodiments of the invention, different color transforms (and thus different algorithms) are used for different pixels. Specifically, an uncorrected image may be partitioned into multiple zones. One zone may include pixels illustrating the subject(s). Another zone may correspond to the background and thus none of the pixels in this zone illustrate the subject.

Figure 4:
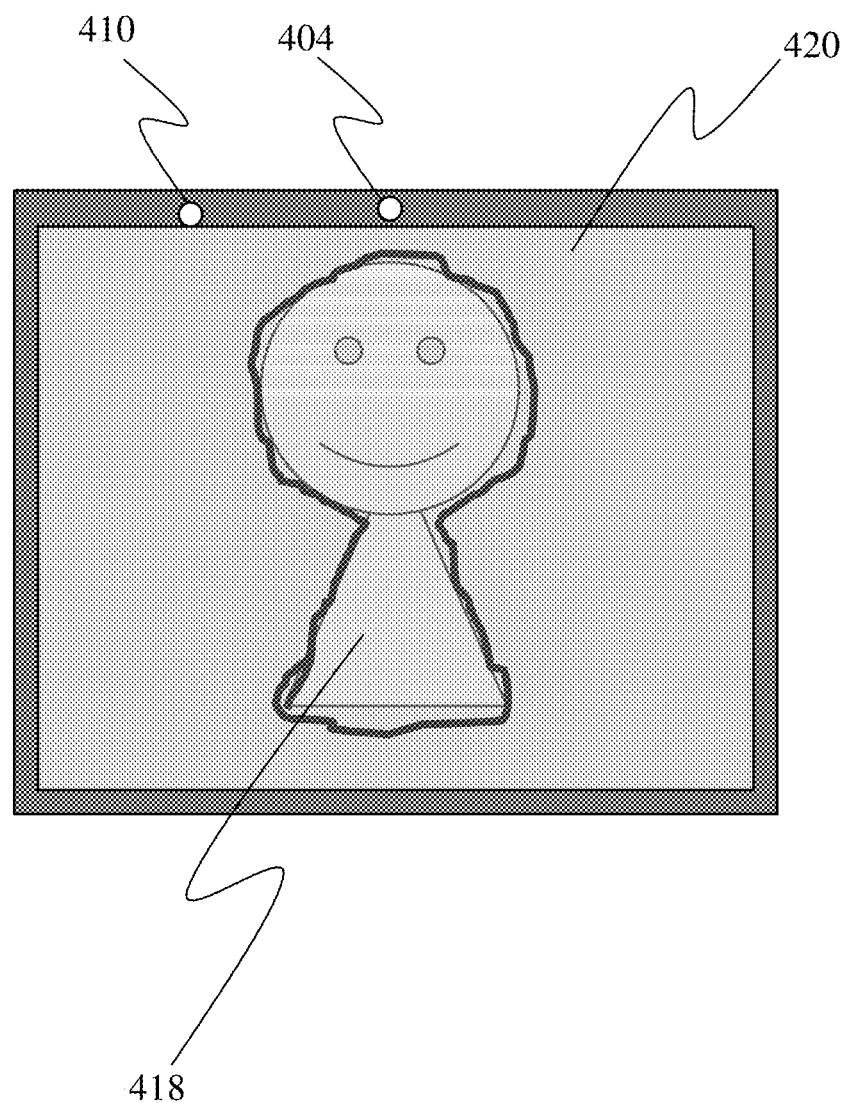
FIG. 4 shows a schematic in accordance with one or more embodiments of the invention.

The effect of the light from the display may vary depending on the distance of the subject from the display. In one or more embodiments, the above test pattern calibration technique may be used to generate multiple parameters to localize the compensation. Referring to FIG. 4, the subject area may be divided into zones, for example an object zone (418) and a background zone (420). Depending on the pixel location, the first color transformation or a second color transformation may be used to adjust the color balance of the camera. Embodiments of the invention are not limited to just two zones, multiple zones may be used depending on the subject area.

Advantageously, embodiments of the invention may allow for high quality color images, regardless of the light emission from the display, even in dim ambient light. Embodiments of the invention may provide a better, more accurate color reproduction during a video conference.

Figure 5:
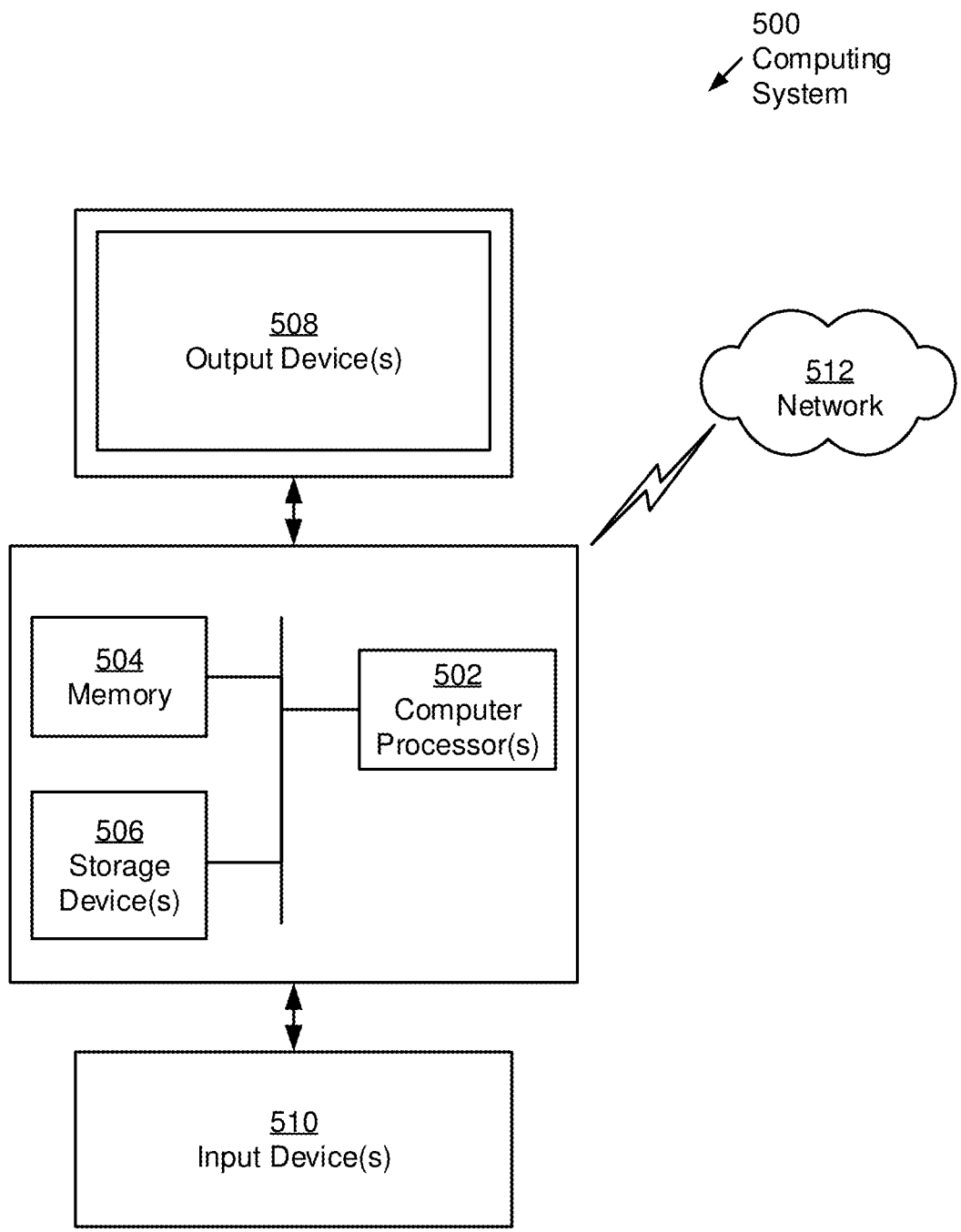
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processor(s) (502) (such as a central processing unit (CPU), integrated circuit, etc.), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer system (500) may also include input means, such as a keyboard (508), a mouse (510), a microphone (not shown), ambient light sensor (not shown), touch screen, and/or video camera (not shown). Further, the computer system (500) may include output means, such as a monitor, or display device (512) (e.g., a liquid crystal display LCD, a plasma display, or cathode ray tube (CRT) monitor). The computer system (500) may be connected to a network (514) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention. Furthermore, the computer system (500) may be implemented as any known type of computing device, e.g., a desktop personal computer, tablet computing device, and/or a mobile computing device, such as a mobile phone.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a tangible computer readable storage medium, such as a compact disc (CD), a diskette, a solid state memory device, a tape, memory, or any other non-transitory tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
outputting, for display on a display device, a plurality of test patterns;
obtaining a plurality of test images of a subject captured by a camera while the subject is exposed to light emitted from the display device displaying the plurality of test patterns;
generating a first color transformation based on the plurality of test images; and
adjusting a color balance of the camera based on the first color transformation.

2. The method of claim 1, wherein generating the first color transformation comprises:
calculating a first plurality of test tristimulus values (TTV) for a pixel in a first test image;
calculating a second plurality of TTV for a pixel in a second test image;
calculating a third plurality of TTV for a pixel in a third test image; and
generating a matrix comprising:
a first plurality of entries calculated by subtracting the first plurality of TTV from the second plurality of TTV; and
a second plurality of entries calculated by subtracting the first plurality of TTV from the third plurality of TTV.

3. The method of claim 2, wherein the first test image is captured by the camera while the first test pattern is displayed on the display device, and wherein the first test pattern is a solid black image.

4. The method of claim 3, wherein the second test image is captured by the camera while the second test pattern is displayed on the display device, and wherein the second test pattern is one selected from a group consisting of a solid red image, a solid green image, and a solid blue image.

5. The method of claim 2, wherein adjusting the color balance comprises:
obtaining a plurality of uncorrected TV and a plurality of prime parameters for a first pixel in an uncorrected image captured by the camera;
calculating a matrix product by multiplying the matrix with the plurality of prime parameters; and
generating a corrected image by subtracting the matrix product from the plurality of uncorrected TV.

6. The method of claim 5, further comprising:
transmitting the corrected image to a participant in a videoconference including the subject.

7. The method of claim 5, further comprising:
generating a second color transformation based on the plurality of test images,
wherein adjusting the color balance of the camera is further based on applying the second color transformation to a second pixel in the uncorrected image, and
wherein the first pixel corresponds to the subject and the second pixel corresponds to a background zone of the uncorrected image.

8. The method of claim 1, further comprising:
detecting, prior to outputting the plurality of test patterns, a change of ambient light within an environment comprising the subject,
wherein the plurality of test patterns are output in response to detecting the change in ambient light.

9. A method comprising:
generating a color transformation based on emission of light from a display device; and
adjusting a color balance of a camera based on the color transformation,
wherein generating the color transformation comprises:
calculating a first plurality of test tristimulus values (TTV) for a pixel in a first test image;
calculating a second plurality of TTV for a pixel in a second test image;
calculating a third plurality of TTV for a pixel in a third test image; and
generating a matrix comprising:
a first plurality of entries calculated by subtracting the first plurality of TTV from the second plurality of TTV; and
a second plurality of entries calculated by subtracting the first plurality of TTV from the third plurality of TTV.

10. A non-transitory computer readable medium (CRM) storing instructions, the instructions comprising functionality for:
outputting, for display on a display device, a plurality of test patterns;
obtaining a plurality of test images of a subject captured by a camera while the subject is exposed to light emitted from the display device displaying the plurality of test patterns;
generating a first color transformation based on the plurality of test images; and
adjusting a color balance of the camera based on the first color transformation.

11. The non-transitory CRM of claim 10, wherein the instructions for generating the first color transformation comprise functionality for:
calculating a first plurality of test tristimulus values (TTV) for a pixel in a first test image;
calculating a second plurality of TTV for a pixel in a second test image;
calculating a third plurality of TTV for a pixel in a third test image; and
generating a matrix comprising:
a first plurality of entries calculated by subtracting the first plurality of TTV from the second plurality of TTV; and
a second plurality of entries calculated by subtracting the first plurality of TTV from the third plurality of TTV.

12. The non-transitory CRM of claim 11, wherein the first test image is captured by the camera during display of the first test pattern on the display device, and wherein the first test pattern is a solid black image.

13. The non-transitory CRM of claim 11, wherein the instructions for adjusting the color balance comprise functionality for:
obtaining a plurality of uncorrected TV and a plurality of prime parameters for a first pixel in an uncorrected image captured by the camera;
calculating a matrix product by multiplying the matrix with the plurality of prime parameters; and
generating a corrected image by subtracting the matrix product from the plurality of uncorrected TV, wherein the corrected image is transmitted to a participant in a videoconference including the subject.

14. The non-transitory CRM of claim 13, the instructions further comprising functionality for:
generating a second color transformation based on the plurality of test images,
wherein adjusting the color balance of the camera is further based on applying the second color transformation to a second pixel in the uncorrected image, and
wherein the first pixel corresponds to the subject and the second pixel corresponds to a background of the uncorrected image.

15. An apparatus comprising:
a display device that displays a plurality of test patterns;
a camera that obtains a plurality of test images of a subject captured while the subject is exposed to light emitted from the display device displaying the plurality of test patterns; and
a controller that:
generates a first color transformation based on the plurality of test images; and
adjusts a color balance of the camera based on the first color transformation.

16. The apparatus of claim 15, further comprising:
an ambient sensor that detects a change in ambient light within an environment comprising the subject,
wherein the plurality of test patterns are displayed in response to the change.

17. The apparatus of claim 15, wherein the controller further:
generates a second color transformation based on the plurality of test images, wherein the color balance of the camera is further adjusted based on the second transformation.

18. The apparatus of claim 17, wherein:
the first color transformation is applied to a first pixel in an uncorrected image from the camera;
the second color transformation is applied to a second pixel in the uncorrected image;
the first pixel corresponds to the subject in the uncorrected image; and
the second pixel corresponds to a background in the uncorrected image.

19. The apparatus of claim 15, wherein the plurality of test patterns comprises a solid black image.

20. An apparatus comprising:
a display device;
a camera; and
a controller that:
generates a color transformation based on emission of light from the display device; and
adjusts a color balance of the camera based on the color transformation,
wherein the controller further:
calculates a first plurality of test tristimulus values (TTV) for a pixel in a first test image;
calculates a second plurality of TTV for a pixel in a second test image;
calculates a third plurality of TTV for a pixel in a third test image; and
generates a matrix comprising:
a first plurality of entries calculated by subtracting the first plurality of TTV from the second plurality of TTV; and
a second plurality of entries calculated by subtracting the first plurality of TTV from the third plurality of TTV.

* * * * *